United States Patent [19]

Preiner et al.

[11] 4,399,193
[45] Aug. 16, 1983

[54] HYDROPHILIC COATINGS AND PROCESS FOR PREPARING THE SAME

[75] Inventors: Gerhard Preiner; Johann Müller; Karl-Heinrich Wegehaupt, all of Burghausen, Fed. Rep. of Germany

[73] Assignee: Wacker-Chemie GmbH, Munich, Fed. Rep. of Germany

[21] Appl. No.: 295,950

[22] Filed: Aug. 24, 1981

[30] Foreign Application Priority Data

Oct. 21, 1980 [DE] Fed. Rep. of Germany ....... 3039721

[51] Int. Cl.$^3$ .................... B05D 3/02; B32B 9/04
[52] U.S. Cl. .................... 428/447; 427/387;
427/391; 428/452; 428/537; 524/588; 524/837;
528/33; 556/457; 556/458; 556/459
[58] Field of Search ............... 427/387, 391; 428/447,
428/452, 537; 528/33; 556/457, 458, 459;
524/588, 837

[56] References Cited

U.S. PATENT DOCUMENTS 3,819,563  6/1974  Takago et al. .................... 524/588
4,301,215  11/1981 Deubzer et al. .................... 428/447
4,311,821  1/1982  Weitemeyer et al. .......... 427/387 X
4,340,090  7/1982  Matsushita et al. ............ 427/387 X

FOREIGN PATENT DOCUMENTS 1541801  3/1979  United Kingdom .

Primary Examiner—Michael R. Lusignan
Assistant Examiner—Thurman K. Page

[57] ABSTRACT

Hydrophilic coatings are obtained by applying to a substrate a composition containing an aqueous soluble organopolysiloxane which is capable of being crosslinked by the addition of Si-bonded hydrogen atoms to SiC-bonded aliphatic multiple bonds, and having at least one oxyalkylene unit bonded to a silicon atom and an aqueous soluble catalyst which promotes the addition of Si-bonded hydrogen atoms to the SiC-bonded aliphatic multiple bonds and thereafter crosslinking the organopolysiloxane by the addition of the Si-bonded hydrogen atoms to the SiC-bonded aliphatic multiple bonds to form a hydrophilic coating on the substrate. The aqueous soluble organopolysiloxane may be obtained from a mixture consisting of equal parts of a mixed hydrolysate, prepared from 1.7 moles of dimethyldichlorosilane, 1 mole of [acetoxy-(hexaethyleneoxy)-propyl]-methyldichlorosilane and 0.3 mole of vinylmethyldichlorosilane, and a mixed hydrolysate prepared from 1 mole of dimethyldichlorosilane, 1 mole of [acetoxy(hexaethyleneoxy)-propyl]-methyl-dichlorosilane and 1 mole of methyldichlorosilane.

9 Claims, No Drawings

HYDROPHILIC COATINGS AND PROCESS FOR PREPARING THE SAME

The present invention relates to hydrophilic coatings and more particularly to a process for preparing hydrophilic coatings from aqueous soluble organopolysiloxanes.

BACKGROUND OF THE INVENTION

Coatings which are obtained by applying aqueous emulsions of organopolysiloxanes containing Si-bonded hydrogen atoms and SiC-bonded aliphatic multiple bonds to substrates and thereafter crosslinking the organopolysiloxanes by the addition of the Si-bonded hydrogen atoms to the SiC-bonded aliphatic multiple bonds are described in British Pat. No. 1,541,801 to Wacker-Chemie. Compared to the process described in the British patent, the process of the present invention has certain advantages. For example, the process of this invention avoids the difficulties generally connected with the preparation and handling of emulsions. Furthermore, the coatings obtained from the present invention are more resistant to attack from water and exhibit better hydrophilic properties.

Therefore, it is an object of the present invention to provide a transparent coating. Another object of this invention is to provide a coating which is gas-permeable and is resistant to attack from water. Still another object of this invention is to provide a process for coating a substrate. A further object of this invention is to coat a substrate with an aqueous soluble organopolysiloxane. A still further object of this invention is to form an elastomeric coating on a substrate from an aqueous soluble organopolysiloxane.

SUMMARY OF THE INVENTION

The foregoing objects and others which are apparent from the following description are accomplished in accordance with this invention, generally speaking, by providing a process for coating substrates to impart hydrophilic properties thereto, which comprises applying an aqueous soluble organopolysiloxane capable of being crosslinked by the addition of Si-bonded hydrogen atoms to SiC-bonded aliphatic multiple bonds and having at least one oxyalkylene unit bonded to the silicon atom to a substrate and thereafter crosslinking the organopolysiloxane by the addition of the Si-bonded hydrogen atoms to the SiC-bonded aliphatic multiple bonds. The resultant coating is transparent, gas permeable and water resistant.

DETAILED DESCRIPTION OF THE INVENTION

Any substrate may be coated by the process of this invention to impart hydrophilic properties thereto in order to facilitate their being coated with aqueous dispersion dyes. Examples of such substrates are the various types of paper, woven or nonwoven fibers made of hydrophobic synthetic polymers, such as polyamides or polyesters, as well as sealants or coatings prepared from organopolysiloxane elastomers.

The aqueous organopolysiloxane solutions of this invention may be applied to the substrates by any conventional process known in the art for coating substrates with liquids, such as, for example by immersion, coating, padding, pouring, spraying, rolling, printing, knife and Meyer-rod coating or with an air brush.

Cross-linking of the organopolysiloxanes by the addition of Si-bonded hydrogen atoms to SiC-bonded groups having aliphatic multiple bonds, may be promoted by any water soluble catalyst which is suitable for this type of addition. Examples of suitable catalysts are $H_2PtCl_6 \cdot 6H_2O$, $PtCl_4$ and Zeise's salt $KPtCl_3C_2H_4$. If the aqueous solutions used in accordance with this invention contain such platinum catalysts, it is preferred that they be used in an amount of from 20 to 350 ppm by weight, and more preferably in an amount of from 50 to 100 ppm by weight of elemental platinum, based on the total weight of the organopolysiloxanes employed.

In order to prevent premature gelling, the aqueous solutions used in accordance with this invention preferably contain at least one water soluble inhibitor such as propargyl alcohol or pyridine.

When the aqueous soluble organopolysiloxanes contain only SiC-bonded organic groups in the molecule and it is desired to prepare elastomeric coatings, then it is preferred that the organopolysiloxanes having SiC-bonded aliphatic multiple bonds be represented by the following formula:

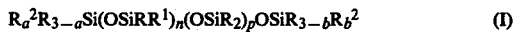

$$R_a{}^2R_{3-a}Si(OSiRR^1)_n(OSiR_2)_pOSiR_{3-b}R_b{}^2 \quad (I)$$

and that the organopolysiloxanes having Si-bonded hydrogen atoms be represented by the following formula:

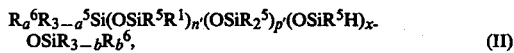

$$R_a{}^6R_{3-a}{}^5Si(OSiR^5R^1)_{n'}(OSiR_2{}^5)_{p'}(OSiR^5H)_{x^-} OSiR_{3-b}R_b{}^6, \quad (II)$$

wherein R represents the same or different monovalent hydrocarbon radicals, $R^1$ represents the same or different radicals of the formula $-R^3(OCHR^4CH_2)_mOY$, $R^3$ represents the same or different bivalent hydrocarbon radicals which are free of aliphatic multiple bonds and have from 1 to 4 carbon atoms; $R^4$ is selected from the group consisting of hydrogen and monovalent hydrocarbon radicals which are free of aliphatic multiple bonds and have from 1 to 4 carbon atoms; Y represents hydrogen or the same or different acyl radicals free of aliphatic multiple bonds and have from 1 to 3 carbon atoms per radical, or $R^4$ and m is an integer having a value of from 2 to 30; $R^2$ represents hydroxyl groups and/or the same or different alkoxy groups and/or R or $R^1$; with the proviso that in the organopolysiloxane of formula (I) no more than one hydrocarbon radical having an aliphatic multiple bond is bonded to each Si atom and that at least two hydrocarbon radicals having aliphatic multiple bonds represented by R and $R^2$ are present per molecule; $R^5$ represents the same or different hydrocarbon radicals which are free of aliphatic multiple bonds; $R^6$ represents hydrogen, alkoxy or hydroxyl groups and/or $R^5$; a is 0 or 1; b is 0 or 1; n is at least 1; n' is at least 1; x is at least 2; p is 0 to m·n−n; and p' is 0 to m·n'−n'−x.

Because of their availability, it is preferred that $R^2$ be the same as R or that it be an alkoxy or hydroxyl group. Therefore, p=0 to m·n−n−2.

Likewise, it is preferred that $R^6$ be the same as $R^5$ or that it be hydrogen or a hydroxyl group. Therefore, p'=0 to m·n'−n'−x−2.

If only two of the R and $R^2$ radicals of the organopolysiloxanes of formula (I) are hydrocarbon radicals having aliphatic multiple bonds, then x must be at least 3.

When x is 2, then at least three of the R and $R^2$ radicals of the organopolysiloxanes of formula (I) must be hydrocarbon radicals having aliphatic multiple bonds.

Examples of hydrocarbon radicals represented by R and $R^2$ which are free of aliphatic multiple bonds are alkyl radicals having from 1 to 8 carbon atoms, such as the methyl, ethyl, n-propyl and the isopropyl radical; as well as the butyl and octyl radicals; cycloalkyl radicals such as the cyclohexyl radical; aryl radicals such as the phenyl radical; alkaryl radicals such as the tolyl radical; and aralkyl radicals such as the benzyl radical. Because of their availability, it is preferred that at least 80 percent of the number of hydrocarbon radicals represented by R and $R^2$ which are free of aliphatic multiple bonds, be methyl radicals.

The vinyl radical is the preferred hydrocarbon radical represented by R and $R^2$ having aliphatic multiple bonds. Additional examples of hydrocarbon radicals represented by R and $R^2$ having aliphatic multiple bonds are the allyl and the methallyl radicals.

It is preferred that the total number of hydrocarbon radicals represented by R and $R^2$ having aliphatic multiple bonds in the organopolysiloxanes of formula (I) not exceed about $1/10$ $(n+p+2)$ per molecule in order to obtain highly elastomeric coatings.

The $-(CH_2)_3$ radical is preferred as the $R^3$ radical.

The alkyl radicals represented by $R^4$ may be methyl, ethyl, n-propyl, isopropyl, n-butyl, sec-butyl or tert-butyl radicals. However, hydrogen is preferred as the $R^4$ radical.

When several $R^4$ radicals are present, then the oxyalkylene radicals may be present as blocks or they may be statistically dispersed throughout the molecule.

The alkyl radicals mentioned for $R^4$ are equally applicable to the alkyl radicals represented by Y. A preferred example of an acyl radical represented by Y is the acetyl radical.

It is preferred that m be from 6 to 15. Also, it is preferred that n be in the range of from 0.3 $(n+p+2)$ to 0.6 $(n+p+2)$. Likewise, it is preferred that p also be in the range of from 0.3 $(n+p+2)$ to 0.6 $(n+p+2)$.

Although only one type of organopolysiloxane, such as represented by formula (I), need be used; it is also possible to use a mixture of at least two different types or organopolysiloxanes, such as represented by formula (I), in the coatings of this invention.

The examples of hydrocarbon radicals represented by R and $R^2$ which are free of aliphatic multiple bonds are equally applicable to the radicals represented by $R^5$ and the hydrocarbon radicals represented by $R^6$.

It is preferred that n' be in the range of from 0.3 $(n'+p'+x+2)$ to 0.6 $(n'+p'+x+2)$. Also, it is preferred that x not exceed more than $\frac{1}{2}$ $(n'+p'+x+2)$.

Likewise, only one type of organopolysiloxane, such as represented by formula (II), need be used; however, a mixture of at least two different types of organopolysiloxanes, such as represented by formula (II), may be used in the coating compositions of this invention.

The viscosities of the organopolysiloxanes represented by formulas (I) and (II) are preferably in the range of from about 50 to $10^6$ mpa.s at 25° C.

The organopolysiloxanes of formula (I) may be prepared, for example, by the cohydrolysis of silanes having the formula R $R^1$ $SiCl_2$ or R $R^1$ Si $(OCH_3)_2$ or R $R^1$ $Si(OC_2H_5)_2$ and silanes of the formula $R_2SiCl_2$ or $R_2Si(OCH_3)_2$ or $R_2Si(OC_2H_5)_2$ in the desired ratios. Furthermore, the organopolysiloxanes of formula (II) may be prepared, for example, by the cohydrolysis of silanes of the formula $RR^1SiCl_2$ or $RR^1Si(OCH_3)_2$ or $RR^1Si(OC_2H_5)_2$ and silanes having the formula $SiRHCl_2$ or $SiRH(OCH_3)_2$ or $SiRH(OC_2H_5)_2$ in the desired ratios. By adding an electrolyte, e.g., NaCl or $Na_2SO_4$, the thus-obtained organopolysiloxanes can easily be separated as concentrated aqueous solutions, generally about 50 percent by weight, and isolated by distilling off the water, although this is not always necessary.

It is preferred that the organopolysiloxanes of formulas (I) and (II) be used in such quantities that the ratio of the gram equivalent of the aliphatic multiple bond to the gram/atom of Si-bonded hydrogen ranges from about 3:1 to 1:10, and more preferably from 1:1 to 1:5.

When elastomeric coatings are desired and the organopolysiloxanes which are present in the aqueous medium contain organopolysiloxanes having both SiC-bonded groups with aliphatic multiple bonds and Si-bonded hydrogen atoms per molecule, then it is preferred that the organopolysiloxane have the formula:

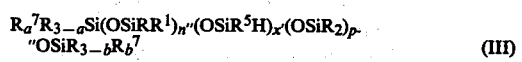

$$R_a{}^7R_{3-a}Si(OSiRR^1)_{n''}(OSiR^5H)_{x'}(OSiR_2)_{p''}OSiR_{3-b}R_b{}^7 \qquad (III)$$

in which R, $R^1$, a and b are the same as above, $R^7$ is the same as $R^2$ or $R^6$; n'' is at least 1; X' is at least 1; and p'' is 0 to $m \cdot n'' - n'' - x'$; with the proviso that the total number of Si-bonded hydrogen atoms and hydrocarbon radicals represented by R and $R^7$ which have aliphatic multiple bonds must be at least 3 per molecule and that no more than 1 hydrocarbon radical having aliphatic multiple bonds is bonded to any one silicon atom.

It is preferred that $R^7$ be the same as R, or that it be an alkoxy or a hydroxyl group. Thus, p''=0 to $m \cdot n'' - n'' - x' - 2$.

It is preferred that n'' and p'' respectively be in the range of from $$0.3(n''+p''+x'+2) \text{ to } 0.6 (n''+p''+x'+2).$$

Also, it is preferred that the total number of hydrocarbon radicals having aliphatic multiple bonds, as represented by R and $R^2$ which are present in the organopolysiloxanes of formula (III) not exceed 0.03 $(n''+p''+x'+2)$ per molecule. Furthermore, it is preferred that x' be in the range of from 0.04 $(n''+p''+x'+2)$ to 0.1 $(n''+p''+x'+2)$.

The coating compositions of this invention may contain only one type of organopolysiloxane as represented by formula (III) or it may contain a mixture of two or more different types of organopolysiloxanes as represented by formula (III).

It is preferred that the viscosity of the organopolysiloxanes represented by formula (III) range from about $10^2$ to $10^6$ mPa.s at 25° C.

The organopolysiloxanes of formula (III) may be prepared, for example, by the co-hydrolysis of silanes of the formula $RR^1SiCl_2$ or $RR^1Si(OCH_3)_2$ or $RR^1Si(OC_2H_5)_2$, $R_2SiCl_2$ or $R_2Si(OCH_3)_2$ or $R_2Si(OC_2H_5)_2$, $SiRHCl_2$ or $SiRH(OCH_3)_2$ or $SiRH(OC_2H_5)_2$ and $R_3SiCl$ or $R_3Si(OCH_3)$ or $R_3Si(OC_2H_5)$ in the desired proportions. It is possible to separate the organopolysiloxanes thus prepared as a concentrated aqueous solution by the addition of electrolytes such as NaCl or $Na_2SO_4$ and thereafter removing the water by distillation; although, it is not essential in all cases.

The proportion of water contained in the solutions obtained in accordance with this invention is preferably in the range of from about 40 to 99 percent by weight, based on the total weight of the organopolysiloxanes and water.

It is preferred that temperatures of from 70° to 165° C. be used for crosslinking the organopolysiloxanes.

At room temperature the catalyzed aqueous solutions of this invention remain substantially unchanged even in the absence of an inhibitor. This is especially surprising in view of German Patent Application No. 2,455,483 which discloses that two separate emulsions should be prepared from diorganopolysiloxanes containing vinyl groups and a platinum catalyst, and organopolysiloxanes containing Si-bonded hydrogen, and that they be combined only shortly before use.

The coatings obtained in accordance with this invention are transparent, gas-permeable and water resistant.

In the following examples, all parts and percentages are by weight unless otherwise specified.

EXAMPLE 1

About 55 moles of water were added dropwise with constant agitation to a mixture containing 1.8 moles of dimethyldichlorosilane, 1 mole of [acetoxy(hexaethyleneoxy)propyl]-methyldichlorosilane, 0.15 mole of methyldichlorosilane and 0.05 mole of vinylmethyldichlorosilane. One hour after the water addition, a clear solution was obtained which was neutralized with aqueous ammonia and then saturated with sodium chloride. The solution separated into two phases in which the upper phase consisted of a 50 percent aqueous solution of organopolysiloxane corresponding to formula (III).

This solution was mixed with 40 ppm by weight of platinum in the form of $PtCl_4$ and applied to paper with the aid of a Meyer rod. The coated paper was then heated for 5 minutes to 150° C. When a drop of water was applied to the treated paper, it had an initial contact angle of 63° and approximately 5 minutes later the drop of water was uniformly distributed over the paper. When such a drop of water is applied to paper coated with a dimethylpolysiloxane, it has a contact angle of 101°.

EXAMPLE 2

(a) About 60 moles of water were added dropwise with agitation to a mixture consisting of 1.7 moles of dimethyldichlorosilane, 1 mole of [acetoxy(hexaethyleneoxy)propyl]-methyldichlorosilane and 0.3 mole of vinylmethyldichlorosilane. One hour after the addition of water, a clear solution was obtained which was neutralized with aqueous ammonia and then saturated with sodium chloride. The solution separated into two phases. The upper phase consisted of a 60 percent aqueous solution of an organopolysiloxane represented by formula (I).

(b) About 12 moles of methanol were added dropwise with agitation to a mixture consisting of 1 mole of dimethyldichlorosilane, 1 mole of [acetoxy(hexaethyleneoxy)propyl]-methyldichlorosilane and 1 mole of methyldichlorosilane. After about 15 minutes 60 moles of water were added to the mixture thus obtained. After stirring for about 1 hour, the solution was neutralized with aqueous ammonia and saturated with sodium sulfate. The solution separated into two phases; the upper phase consisted of a 55 percent aqueous solution of an organopolysiloxane represented by formula (II).

(c) A mixture consisting of the upper phases obtained in accordance with Examples 2(a) and 2(b) in equal parts, was mixed with about 40 ppm by weight of platinum in the form of platinum tetrachloride ($PtCl_4$) and applied to paper with the aid of a Meyer rod. The thus-coated paper was heated for 5 minutes to 150° C. When a drop of water was applied to the paper, it dispersed quickly over the treated paper.

What is claimed is:

1. A process for coating a substrate which comprises applying to the substrate an aqueous solution containing an organopolysiloxane having Si-bonded hydrogen atoms and SiC-bonded hydrocarbon groups with aliphatic multiple bonds, in which the total number of Si-bonded hydrogen atoms and Si-bonded hydrocarbon groups having aliphatic multiple bonds is at least 3 per molecule, with the proviso that no more than one hydrocarbon group having aliphatic multiple bonds is bonded to any one silicon atom and having at least one SiC-bonded radical of the formula —$R^3$—$(OCHR^4CH_2)_mOY$ per molecule, where $R^3$ represents a bivalent hydrocarbon radical free of aliphatic multiple bonds having from 1 to 4 carbon atoms, $R^4$ is selected from the group consisting of hydrogen and a monovalent hydrocarbon radical which is free of aliphatic multiple bonds and has from 1 to 4 carbon atoms, Y is selected from the group consisting of hydrogen, an acyl radical having from 1 to 3 carbon atoms per radical which is free of aliphatic multiple bonds and $R^4$ and m is an integer of from 2 to 30 and a platinum catalyst capable of promoting the addition of Si-bonded hydrogen to SiC-bonded hydrocarbon groups having aliphatic multiple bonds and thereafter heating the coated substrate to a temperature of from 70° to 165° C. to crosslink the organopolysiloxane.

2. The process of claim 1, wherein the aqueous solution contains an organopolysiloxane having at least two SiC-bonded hydrocarbon groups per molecule having aliphatic multiple bonds with the proviso that no more than one hydrocarbon group having aliphatic multiple bonds is bonded to any one silicon atom and having at least one SiC-bonded radical of the formula —$R^3(OCHR^4CH_2)_mOY$ and an organopolysiloxane having at least two Si-bonded hydrogen atoms per molecule and at least one SiC-bonded radical of the formula —$R^3(OCHR^4CH_2)_mOY$ in which $R^3$ represents a bivalent hydrocarbon radical free of aliphatic multiple bonds having from 1 to 4 carbon atoms, $R^4$ is selected from the group consisting of hydrogen and a monovalent hydrocarbon radical which is free of aliphatic multiple bonds and has from 1 to 4 carbon atoms, Y is selected from the group consisting of hydrogen, an acyl radical having from 1 to 3 carbon atoms per radical which are free of aliphatic multiple bonds and $R^4$ and m is an integer of from 2 to 30 and a platinum catalyst capable of promoting the addition of Si-bonded hydrogen to SiC-bonded hydrocarbon groups having aliphatic multiple bonds and thereafter heating the coated substrate to a temperature of from 70° to 165° C. to crosslink the organopolysiloxane.

3. The process of claim 2, wherein the organopolysiloxane having SiC-bonded organic groups with aliphatic multiple bonds is represented by the formula:

$R_a^2R_{3-a}Si(OSiRR^1)_n(OSiR_2)_pOSiR_{3-b}R_b^2$ in which R represents a monovalent hydrocarbon radical, $R^1$ represents a radical of the formula $$-R^3(OCHR^4CH_2)_m OY,$$

$R^3$ represents a bivalent hydrocarbon radical which is free of aliphatic multiple bonds and has from 1 to 4 carbon atoms, $R^4$ is selected from the group consisting of hydrogen and a monovalent hydrocarbon radical which is free of aliphatic multiple bonds and has from 1 to 4 carbon atoms, Y is selected from the group consisting of hydrogen, an acyl radical which is free of aliphatic multiple bonds and has from 1 to 3 carbon atoms per radical and $R^4$, $R^2$ is selected from the group consisting of R, $R^1$, hydroxyl and alkoxy groups, with the proviso that no more than one hydrocarbon radical having an aliphatic multiple bond may be bonded to any one silicon atom and that at least two hydrocarbon radicals having aliphatic multiple bonds represented by R and $R^2$ are present per molecule, a is 0 or 1, b is 0 or 1, m has a value of from 2 to 30, n is at least 1, and p is 0 to m·n−n.

4. The process of claim 1, wherein the organopolysiloxane which has SiC-bonded groups having aliphatic multiple bonds and Si-bonded hydrogen atoms, is represented by the formula:

$$R_a^7 R_{3-a}Si(OSiRR^1)_{n''}(OSiR^5H)_{x'}(OSiR_2)_{p''}OSiR_{3-b}R_b^7$$

in which R represents a monovalent hydrocarbon radical, $R^1$ represents a radical of the formula $$-R^3-(OCHR^4CH_2)_m OY,$$

$R^3$ represents a bivalent hydrocarbon radical which is free of aliphatic multiple bonds and has from 1 to 4 carbon atoms, $R^4$ is selected from the group consisting of hydrogen and a monovalent hydrocarbon radical which is free of aliphatic multiple bonds and has from 1 to 4 carbon atoms, Y is selected from the group consisting of hydrogen, an acyl radical which is free of aliphatic multiple bonds and has from 1 to 3 carbon atoms per radical and $R^4$, $R^7$ is selected from the group consisting of hydrogen, hydroxyl, alkoxy, R and $R^1$, with the proviso that the total number of Si-bonded hydrogen atoms and hydrocarbon radicals represented by R and $R^7$ having aliphatic multiple bonds per molecule, is at least 3 and no more than one hydrocarbon radical having an aliphatic multiple bond is bonded to any one Si atom, a is 0 or 1, m has a value of from 2 to 30, n'' is at least 1, x' is at least 1, and p'' is 0 to m·n''−x.

5. The coated substrate obtained from the process of claim 1.

6. The coated substrate obtained from the process of claim 4.

7. The coated substrate obtained from the process of claim 2.

8. The coated substrate obtained from the process of claim 3.

9. The process of claim 2, wherein the organopolysiloxane having Si-bonded hydrogen atoms is represented by the formula $$R_a^6 R_{3-a}^5 Si(OSiR^5R^1)_{n'}(OSiR_2^5)_{p'}(OSiR^5H)_x OSiR_{3-b}R_b^6$$

in which R represents a monovalent hydrocarbon radical, $R^1$ represents a radical of the formula $$-R^3(OCHR^4CH_2)_m OY,$$

$R^3$ represents a bivalent hydrocarbon radical which is free of aliphatic multiple bonds and has from 1 to 4 carbon atoms, $R^4$ is selected from the group consisting of hydrogen and a monovalent hydrocarbon radical which is free of aliphatic multiple bonds and has from 1 to 4 carbon atoms, Y is selected from the group consisting of hydrogen, an acyl radical which is free of aliphatic multiple bonds and has from 1 to 3 carbon atoms per radical and $R^4$, $R^5$ represents a hydrocarbon radical which is free of aliphatic multiple bonds, $R^6$ is selected from the group consisting of hydroxyl and an $R^5$ radical, a is 0 or 1, b is 0 or 1, m has a value of from 2 to 30, n' is at least 1, x is at least 2, and p' is 0 to m·n'−n'−x.

* * * * *